(12) United States Patent
Terao et al.

(10) Patent No.: US 6,821,596 B2
(45) Date of Patent: Nov. 23, 2004

(54) INFORMATION RECORDING MEDIUM, INFORMATION RECORDING METHOD, AND INFORMATION REPRODUCING METHOD

(75) Inventors: Motoyasu Terao, Hinode (JP); Yuko Tsuchiya, Tokorozawa (JP); Takuya Matsumoto, Hachioji (JP); Kyoko Kojima, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/464,516

(22) Filed: Jun. 19, 2003

(65) Prior Publication Data

US 2004/0028869 A1 Feb. 12, 2004

(30) Foreign Application Priority Data

Aug. 6, 2002 (JP) ........................................ 2002-228094

(51) Int. Cl.$^7$ ................................................ B32B 3/02
(52) U.S. Cl. ..................... 428/64.1; 428/64.4; 428/64.5; 428/323; 430/270.13
(58) Field of Search ............................... 428/64.1, 64.4, 428/64.5, 323, 328, 913; 430/270.13, 495.1, 945

(56) References Cited

U.S. PATENT DOCUMENTS 5,461,600 A * 10/1995 Pohl .......................... 369/44.38
5,598,387 A * 1/1997 Pohl .......................... 369/44.37

FOREIGN PATENT DOCUMENTS

JP          2001-344807          12/2001    ............ G11B/7/24

OTHER PUBLICATIONS

Shouheng Sun, et al., "Polymer Mediated Self–Assembly of Magnetic Nanoparticles", JACS Communications, vol. 124, No. 12, 2002, J. AM. Chemical Society, pp. 2884–2885.

K.M. Leung, "Optical Bistability in the Scattering and Absorption of Light from Nonlinear Microparticles", Physical Review A, vol. 33, No. 4, Apr. 1986, pp. 2461 & 2464.

D.S. Chemla, et al., "Mechanism for Enhanced Optical Nonlinearities and Bistability by Combined Dielectric–electronic Confinement in Semiconductor Microcrystallites", Optics Letters, vol. 11, No. 8, Aug. 1986, pp. 522–524.

S. Schmitt–Rink, et al., "Theory of the Linear and Nonlinear Optical Properties of Semiconductor Microcrystallites", Physical Review B, vol. 35, No. 15, May 15, 1987, pp. 8113–8125.

J.W. Haus, et al., "Optical Bistability in Small Metallic Particle Composites", J. Appl. Phys., vol. 65, No. 4, Feb. 15, 1989.

P. Royer, et al., "Substrate Effects on Surface–Plasmon Spectra in Metal–Island Films", Physical Review B, vol. 35, No. 8, Mar. 15, 1987, pp. 3753–3759.

Michikazu Horie, et al., "Material Characterization of Growth–Dominant Ge (Sb70Te30)+Sb for Phase–Change Optical Recording Media", Mitsubishi Chemical Corporation, pp. 20–25.

* cited by examiner

*Primary Examiner*—Elizabeth Mulvaney
(74) *Attorney, Agent, or Firm*—Antonelli, Terry, Stout & Kraus, LLP

(57) ABSTRACT

The information recording medium accosting to the preferred embodiment of the present invention achieves high-speed, high-density recording. The layer, in which ultra-particles made from an optical absorption metal, dielectric, or recording material are formed into regular arrays, is deposited. Resonant Plasmon excitation and resonance absorption of ultra-particles enable the edges of the recorded marks to be identified clearly and intense absorption to occur only in the given layer depending on the wavelength in the case of the multi-layer medium achieving high-density, large-capacity recording.

14 Claims, 6 Drawing Sheets

INFORMATION RECORDING MEDIUM, INFORMATION RECORDING METHOD, AND INFORMATION REPRODUCING METHOD

BACKGROUND OF THE INVENTION

1. Field of the Invention

The present invention relates to an information recording medium using light, a method for recording information on the information recording medium, and an information recording device.

2. Description of Related Art

Various principles for recording information by irradiating light on a recording film have been known and among them, those using a change in atomic arrangement caused by heating, for example, phase change in a film material (also referred to as phase transition or phase transformation) have such an advantage that an information recording medium, on which information can be overwritten plural times, is achieved.

For example, as disclosed in JP-A No. 344807/2001, this type of phase-change optical disks are composed of a protective layer, a recording film made from a GeSbTe derivative, another protective layer, and reflective layer deposited on a substrate.

On the other hand, optical disks with a recording layer made from an organic material include CD-R and DVD-R. For this type of optical disks, information is recorded on them by irradiating a laser beam for transformation on the recording layer containing a dye, which may absorbs a wavelength of a recording light source, and the surface of the substrate in contact with the underside of the recording layer.

Another information recording method enabling ultra-high density recording by irradiating a variable wavelength laser, wherein a dye is coated around plural latex bulbs with slightly different sizes and resonance absorption takes place at individual wavelengths corresponding to their diameters, has been reported.

With a technique referred to as photo assist or thermal assist magnetic recording or magnetic-optical merged recording, information is recorded on the recording medium with an easy-to-magnetize axis perpendicular to its film surface at a high density by irradiating pulses or continuous laser beams while applying a modulated magnetic field from a coil and read out by a magnetic head compatible with the magnetic disk.

SUMMARY OF THE INVENTION

To record information on the optical disk, photo-assist magnetic disk, and thermal-assist magnetic disk at a high density, a binary recording or multi-level recording method, namely a modulation system where the lengths of recording marks finely adjusted, has been developed and enables high density recording in theory, though practically, it has such a problem that the start and end edges of the recoding mark is easy to shift due to various factors, disturbing the recording density from being improved.

Although it is preferable that the magnetic disk is multi-layered to improve the recording density effectively, it is difficult. Since in the case of a double-layered DVD, a focus point is changed in recording information and in the case of three or more layered DVD, laser power is lost by absorption and reflection, and spherical aberration is easy to develop.

For the multi-layer (3D) recording method using a 2-photon absorption effect of a transparent material on a recording light, required laser power is very large because a 2-photon absorption transition possibility is very low and a short pulse laser is required.

A wave length multiplexed recording method using latex bulbs has such problems that the distribution of the sizes of the bulbs cannot be controlled and a reproduced signal level increases depending on a wavelength. The object of the present invention is to solve these problems and achieve ultra-high density information recording.

Now, the configuration of the present invention to solve the above-mentioned problems is described below.

By building a periodic-structure with very low optical absorption and reflectance factors in the recording film of the recording medium or a layer adjacent the recording film using self-assembly adapted to the undulations on the substrate surface, the leading and trailing edges of the recording mark can be correctly positioned, achieving high density recording.

As the material for the self-assembly film, metal ultra-fine particles with, for example, thiol derivative organic molecules, oleyl amine molecules, and oleic acid molecules coated around them are used.

This type of material is self-assembled at film formation by depositing from a solution or by applying with. UV curing resign and heating to rearrange ultra-fine particles.

The arrays of the ultra-particles of the self-assembly film is preferably aligned in the direction of the tracking groove. This causes the inorganic substances of the ultra-fine particles and the organic substances around them to arrange alternately. To make the disk multi-layered, after the material is self-assembled, a thermal insulation spacer layer is deposited and another self-assembled film is formed.

The principle for recording information includes phase change or magnetization reversal or change in color by heating of the ultra-fine particles themselves as well as change in the mixed phase-change recording material or phase-change recording material with a film coated on it and change in color.

In the present invention, the concave part of the substrate is referred to as a grove. The portion between the grooves is referred to as a land.

When a light beam enters the film through the substrate, the grove looks to be convex-shaped from the viewpoint of an incident side.

For this reason, in the case of the system where the light beam enters the film from the opposite side of the substrate, a portion, which looks to be convex-shaped from the viewpoint of the incident side, may be also referred to as the groove.

However, this designation is opposite to the definition in the present invention because this portion looks to be convex-shaped when only the substrate is focused on, though in fact, it is the land defined between the grooves.

In the case of a so-called in-groove recording method where information is record on either the land or the groove, in many cases, better recording characteristics are exhibited when information is recorded on the convex portion from the viewpoint of the light incident side whether the light beam enters the film from the substrate side or from the opposite side of the substrate, through information may be recorded on the portion, which looks to be concave-shaped from the viewpoint of the light incident side, because no significant difference lies between two recording methods.

The multi-layer recording method of the present invention is also suitable for further improving a recording density.

Although it is preferable that the recording medium is made multi-layered to improve the effective recording density (effective surface density), in the case of conventional recording medium, either the quality of reproduced signals or recording sensitivity is bound to be sacrificed because spherical aberration tends to develop on the third layer or higher, as well as a tradeoff exist between transmittance and recording sensitivity of each layer.

Such a medium type that information is 3D-recorded including the direction of thickness on a transparent organic material has been known but for the type using 2-photon absorption, recording sensitivity is very low, while for the type using photopolymerization, storage-stability and recording sensitivity are low.

However, according to the preferred embodiment of the present invention, resonance absorption of the semiconductor laser beam can be induced to vary the wavelength of the beam sophisticatedly, for example, by accreting dye molecules around dielectric ultra-fine particles with different sizes for each layer, achieving optical absorption by the target layer only with no adverse influence of optical absorption at the light incident side.

The recording medium of the present invention is effective with recording density (track pitch, bit pitch) higher than that of the 2.6 GB DVD-RAM Standard and in particular, more effective with recording density higher than that of 4.7 GB DVD-RAM Standard.

If the wavelength of a light source is not around 660 nm (for example, it is around 400 nm or the numerical aperture (NA) of a condenser is not 0.65), it is effective with recording density higher than those converted into a wavelength ratio and NA ratio in both the radial and tangential directions.

Note that in this specification, the term "a phase change" is used to represent the phase changes, melting (change into the liquid phase)—re-crystallization and crystal-crystal state change in addition to crystal-amorphous.

The experiment, which gave an embodiment of the present invention, was conducted using a standard optical head receiving the light beam from the substrate side, though using a focusing lens with about 0.85 of NA and the head receiving the light beam from the opposite side of the substrate or a near-field head, high density recording suitable for the recording medium of the present invention can be achieved.

BRIEF DESCRIPTIONS OF THE DRAWINGS

DETAILED DESCRIPTION OF THE PREFERRED EMBODIMENT

Embodiment 1

(Configuration and Manufacturing Method)

Figure 1:
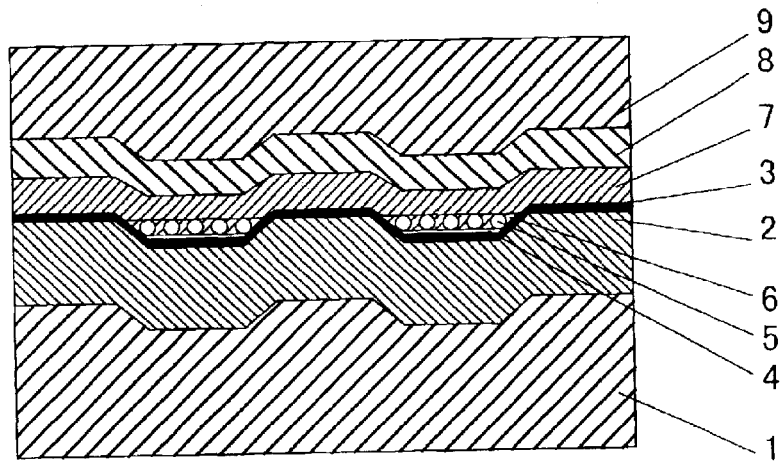
FIG. 1 is a view showing the cross section of an information recording medium according to one preferred embodiment of the present invention.

The recording medium of the present invention has a configuration as shown in FIG. 1.

This medium was made as described below.

First, a lower protective layer 2 made from $(ZnS)_{80}(SiO_2)_{20}$ was formed as a 50 nm thick film on a polycarbonate substrate 1 with 8 cm of diameter and 0.6 mm of thickness, of which surface had tracking grooves (width 0.15 $\mu$m) with 0.4 $\mu$m of track pitch and 25 nm of depth for in-groove recording (land recording from the viewpoint of a optical spot) and, on which addresses were represented by wobble of the grooves.

Further, on the protective layer, a $Ge_2Sb_2Te_5$ phase-change recording film 3 with 10 nm of thickness was formed.

Groove patterns were transcribed on the substrate surface using a nickel master whose groove patterns were transcribed from glass master photo resist.

As described in the paper on the manufacturing method of the recording film of a magnetic recording disk in J. Am. Chem. Soc. vol.124, No. 12, p2884 (2002) by Shouheng Sun et al., polyethylene imine 4 dissolved in a chloroform solution was coated on the above-mentioned substrate and then dried.

Second, polyethylene imine thinly coated on the land portion was removed by a plasma-asher. At this time polyethylene imine remained only at the groove portions.

Third, many $Pt_{50}Fe_{50}$ alloy particles with 15 nm of diameter, around which oleyl amine and oleic acid molecules were coated, were dispersed into the hexane solution and coated, and then the particles not adhered to polyethylene imine were rinsed away and dried.

Figure 2:
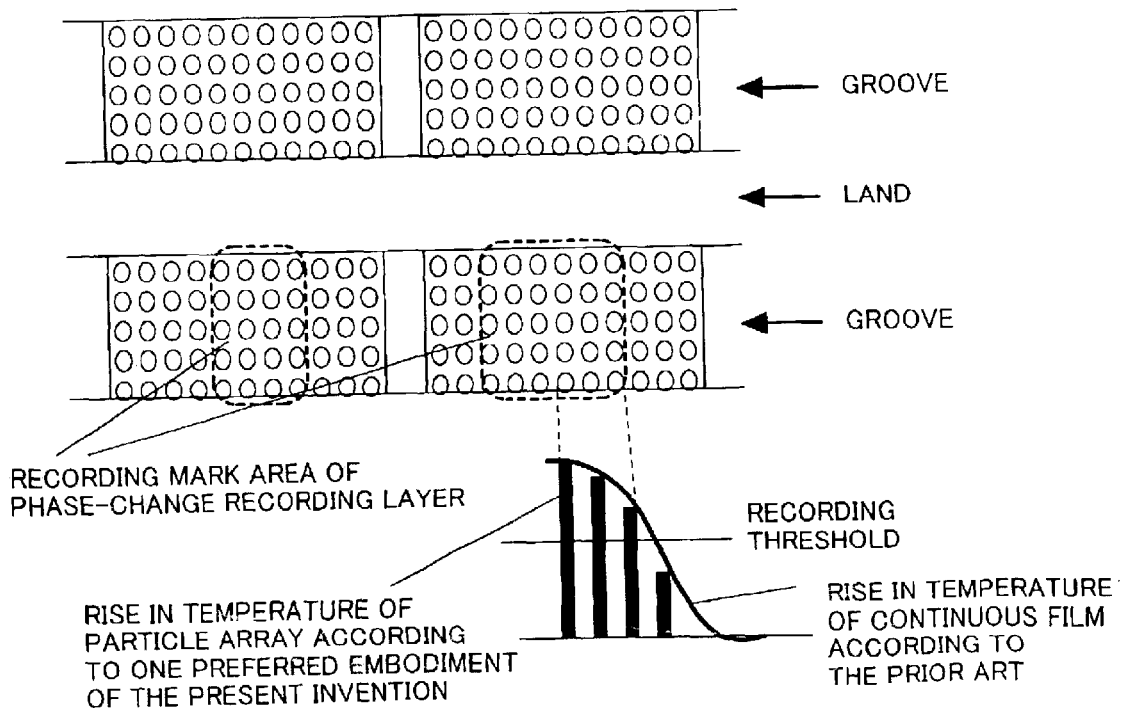
FIG. 2 is a plan view showing part of the information recording medium according to one preferred embodiment of the present invention.
Figure 3:
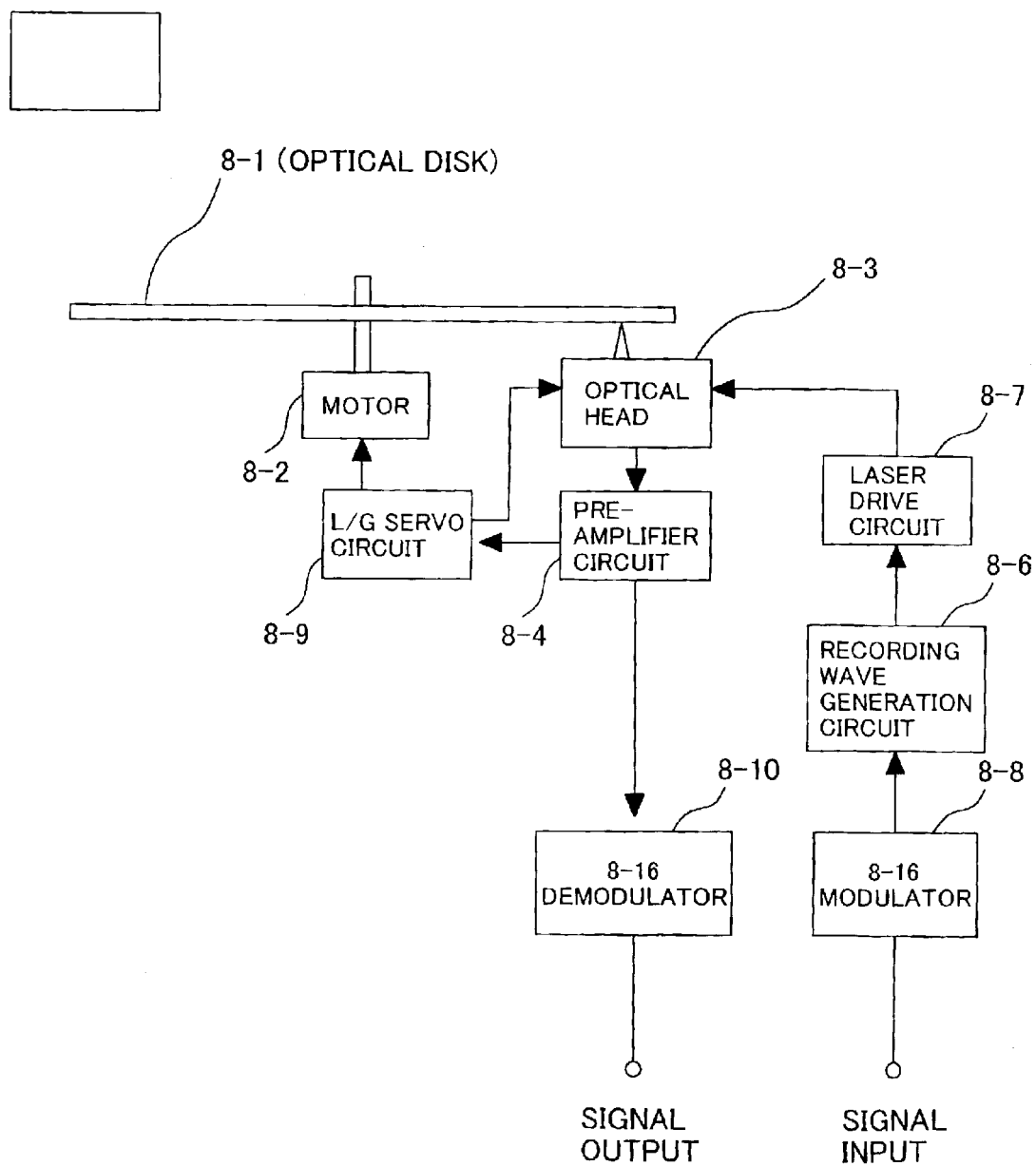
FIG. 3 is a block diagram showing the device according to one preferred embodiment of the present invention.
Figure 4:
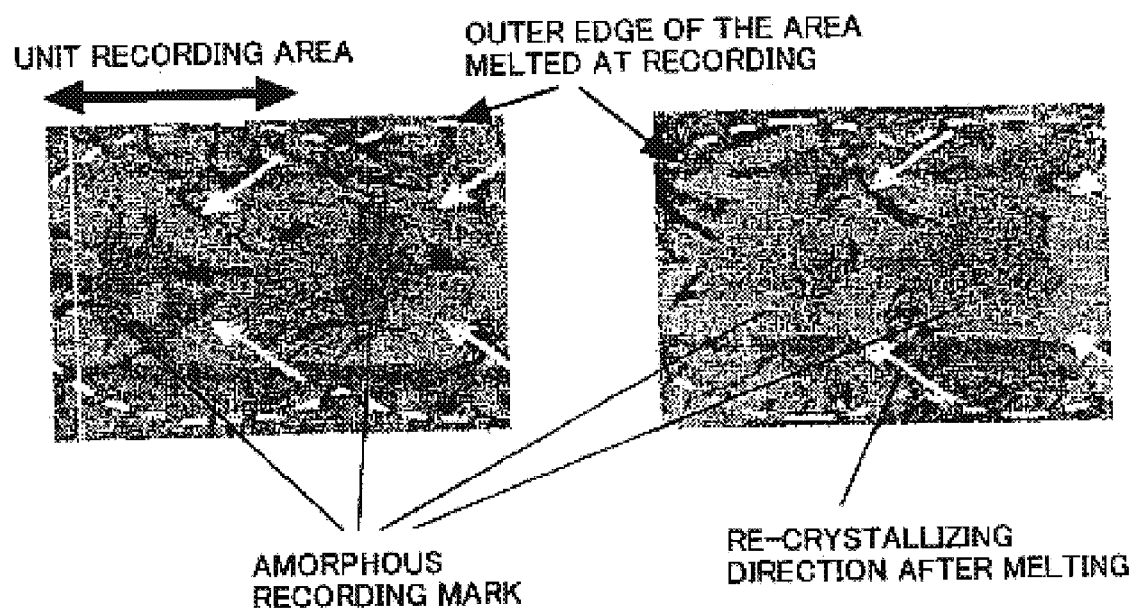
FIG. 4 is a view showing an example of multi-value marks recorded on the conventional phase-change recording medium.

As shown in FIG. 2, the above-mentioned tracking grooves are intermittent at an interval of 330 nm and an about 50 nm non-groove portion lies interrupting the grooves.

Pt—Fe particles regularly packed in the groove portions at an interval of 30 nm formed arrays as shown in FIG. 2.

The above-mentioned Pt—Fe particles with oleic acid particles adhered around them were produced in the same method as that for magnetic disks described in the embodiment 1 of JP-A No. 54012/2000.

On this layer, 20 nm-thick $(ZnS)_{80}(SiO_2)_{20}$ protective layer 7 and 60 nm $Al_{90}Ti_{10}$ reflective layer 8 were formed.

For the recording layer, a known Ge—Sb—Te system recording material, for example $Ge_2Sb_2Te_5$ or $Ge_5Sb_{70}Te_{25}$, or an Ag—In—Sb—Te system recording material was used.

Those films were formed using magnetron-spattering equipment.

Thanks to the existence of regularly arranged Pt—Fe particles with the same size described above, a light beam transmitting the Ge—Sb—Te recording layer, when being absorbed by these particles, generates heat, which is transferred to the recording film.

Accordingly, the position of the edge of a phase-change recording mark formed at recording is forced to almost align with the edge of the Pt—Fe particle array because a periodical thermal pattern develops on the recording layer, causing a rapid drop in temperature between Pt—Fe particles.

As described in K. M. Leung, Phys. Rev. vol.A33 p2461 (1986), D. S. Chemla and D. A. B. Miller, Opt. Lett. Vol.11, p522 (1986), Schmitt-Rink, D. A. B. Miller and D. S. Chemla, Phys. Rev. vol. B35, p8113 (1987), J. W. Haus, N. Kalyaniwalla, R. Inguva and C. M. Bowden, J. Appl. Phys. Vol. 65, p1420 (1989) P. Royer, J. P. Goudonnet, R. J. Warmack and T. L. Ferrell, Phys Rev. vol. B35, p3753 (1987), in the case of metals including Pt—Fe, an irradiated light beam induces plasmon excitation, producing a non-linear effect, in which optical absorption and optical reflection is not proportional to the intensity of light beam irradiation.

This effect becomes notable when a light beam with its wavelength slightly sifted from the Plasmon resonance absorption wavelength of the metal particles, is irradiated, and in this case, absorption of a light beam with a certain level or higher intensity shifts the resonance wavelength, which induces resonance absorption at the wavelength of the irradiated light beam, augmenting optical absorption rapidly.

This type of non-linear effect become notable, in particular when an organic or inorganic dielectric material having the non-linear effect coated on the metal particle surfaces, however it may develop even if the coating material has no non-linear effect.

Oleil amine, oleic acid, and polyethylene imine according to the preferred embodiment of the present invention have a weak non-linear effect.

Pt—Co and unit metals such as Au and Ag may be preferably substituted for Pt—Fe. For Au, straight-chain hydro-carbon molecules with thiol groups bound to their ends are preferably coated on the particles instead of oleil amine or oleic acid.

PVP (poly-vinyl pyrolidone) may be used instead of polyethylene imine to perform the same process.

Although polyethylene imine is removed from the land portion in the preferred embodiment of the present invention, Pt—Fe particles may be self-assembled in the land portion where polyethylene imine is left as it is.

Note that in this case, information may be recorded in not only the grooves but also land portion. However in this case, for groove recording, recording mark extends to land portion or for land groove recording, part of the recording mark on land may be erased which limits narrowing of track pitch.

According to the preferred embodiment of the present invention, the self-assembled film may be formed by coating a material on the layer or dipping, alternately it may be formed by scooping it from the surface of a solution with the coating material dissolved using the LB (Langmur-Broiget) method.

Note that the area of the recording region becomes larger, it is made more difficult to self-assemble the entire region.

When a phase-change recording layer is deposited, laser-heating causes the recording film to be crystallized or its phase to changes to amorphous state.

Information may be recorded on the medium using a change in another deposited layer made from an organic or inorganic material, for which at least one of the refractive index and extinction coefficient may vary depending on a chemical change (for example, decolorization in dye) caused by heat treatment.

Note that UV cured resin 9 was coated on the film surface of the above-mentioned disk element and glued together with another substrate of the same shape to obtain the disk-shaped information recording medium.

The recording and reproducing laser light beams were entered into the film from the substrate side. The laser beams may be entered from the glued substrate. Note that in this case, the thickness of the recording film was defined so that the reflectance was about 10% and a satisfactory contrast ratio could be achieved at reading.

(Initial Crystallization)

The phase-change recording layer of the disk made as described above was initially crystallized in the following manner. While the disk was rotating, an about 810 nm wavelength of semiconductor laser beam at 800 mW, of which spot shape was longer in the radial direction of the medium, was irradiated onto the recording layer through the substrate.

The spot was shifted gradually by ¼ of the spot length in the radial direction of the medium.

This way, initial crystallization was performed. This initial crystallization might be performed once, though rise in noise could be slightly reduced when it was applied two times.

(Recording/Erasing/Reproduction)

First, the ZCAV (Zoned Constant Linear Velocity) method, namely a motor control method used in reproducing records, which changes the revolution speed of the disk for each zone where information is reproduced, is described.

Information obtained from a device external to the recording device is transmitted to an 8-16 modulator in the form of one unit block of eight bits.

When information was recorded on the information recording medium (hereafter, simply referred to as an optical disk), the so-called 8-16 modulation system, a modulation system for converting eight bits of information to 16 bits was used for recording.

In this type of modulation system, 3-14T-long marks corresponding to eight bit information are recorded as a unit on the medium.

In the figure, the 8-16 modulator is responsible for this modulation step. Where, T indicates the clock cycles generated during information recording. The disk was rotated so that the linear speed relative to the optical spot might be 15 m/s. 3-14T digital signals converted by the 8-16 modulator are transferred to a recording wave generation circuit to produce multi-pulse recording waveforms.

At this time, the higher power level for forming the recording mark was set to 5 mW, the middle power level capable of erasing the recording mark to 2 mW, and the lower power level to 0.1 mW, respectively.

Even if the linear speed is changed from 15 m/s, no significant variation was observed in these power levels. Information could be practically read in the range from 0.2 to 2 mW.

Reading out information over a long period of time at a power level above 2 mW caused deterioration in recorded data.

In addition, in the above-mentioned recording wave generation circuit, 3-14T signals are alternately corresponded to "0" and "1" in time-series. In this case, the area, into which a high power level of pulse is irradiated changes to the amorphous state (mark area).

In the above-mentioned recording wave-form generation circuits 8-6 have individual multi-pulse wave-form tables compatible with the system for varying the widths of the top and end pulses of a multi-pulse wave-form depending on the length of the space portion before and after the mark area in arranging a series of high power pulse arrays for performing the mark area, thereby the multi-pulse recording wave-form capable of minimizing any possible effect of heat interference on the space between the marks can be generated.

The recording wave-form generated at the recording wave generation circuit is transferred to a laser drive circuit, which in turn, causes the semiconductor laser beam to emit from the optical head based on the recording wave.

An about 400 nm wavelength of semiconductor laser is used in the optical head mounted on the recording device of the present invention as a laser for information recording. The laser beam was irradiated for information recording by focusing on the recording layer of the above-mentioned optical disk through a NA0.63 objective lens.

In the case of the phase-change recording layer, the reflectance of the medium is higher in the crystal area while lower in the amorphous area where information has been recorded. Repetition of pulse laser beam irradiation according to the supplied information signals achieves amorphous recording mark arrays.

Recorded information was also reproduced using the above-mentioned optical head. By irradiating the laser beam on the recorded marks to detect the beam reflected from the marks and spaces between marks, reproduced signal is obtained. The amplitude of the reproduced signal is amplified at a pre-amplifier circuit and every 16 bit information is converted to 8 bit information at a 8-16 demodulator. Once the above-mentioned steps have been successfully finished, the signal has been reproduced.

If mark edge recording is performed under the above-mentioned conditions, the length of the 3T mark, a shortest one, is about 0.20 μm while the length of the 14T mark is about 1.96 μm. The recording signal contains dummy data on the repetition of the 4T mark and 4T space at its start and end edges. At its start edge, VFO is also contained.

(Mark Edge Recording)

The mark edge recording system capable of achieving high density recording has been incorporated in the recording media DVD-RAM and DVD-RW. The mark edge recording system causes the positions of both the start and end edges of the recorded mark formed on the recording film to be associated with digital data one (1), thereby recording density can be made higher by associating the length of the shortest recorded mark with two or three reference clocks instead of singe clock.

DVD-RAM has incorporated the 8-16 modulation system and associates the shortest recorded mark with three reference clocks. The mark edge recording system has an advantage over the mark position recording system, which associates the center position of a circular recorded mark with digital data one (1), in that information can be recorded at a higher density without extremely reducing the size of the recorded mark.

When the modulation system which sets the length of shortest recorded mark length divided by reference clock to a smaller value, recording density is improved. It is required that any distortion in the shape of the recorded mark be small in the recording medium and this requirement had not been satisfied until the recording medium according to the preferred embodiment of the present invention was developed. In the case of the recording medium according to the preferred embodiment of the present invention, good reproduced signals may be obtained even if the step is equal to ⅔ of that in the 8-16 modulation system.

In the case of the phase-change medium, it is preferable that information is recorded at the fixed optimal linear speed corresponding to the speed of crystallization to achieve better recording reproduction characteristics if recording waveform is not changed along with the linear speed. On the other hand, it takes time to adjust the revolution speed to the linear speed in accessing another recording track at a different disk radius than that of present recording track.

To address this problem, DVD-RAM has incorporated the ZCLV (Zoned Constant Linear Velocity) system, in which the disk space is split into 24 radial zones not to reduce the access speed, the disk is forced to rotate at a fixed revolution speed, and the revolution speed is changed only when another zone is accessed.

This system enables information to be recorded over the entire disk space at the almost highest recording density with a little difference in recording density, which is caused by a slight difference in linear speed between the innermost and outermost tracks in the zone.

On the other hand, the CAV system with a fixed revolution speed which has an advantage in that the revolution speed need not to be changed even if the radial point far away from the present point is accessed, is more preferable and suitable for mobile devices because the power consumption for changing the revolution speed can be minimized.

It is also important to prevent re-crystallization from occurring. It is because a wider area needs to be melted for forming a given size of recorded mark if the remaining area for forming the amorphous recording mark is reduced by re-crystallization starting from the periphery of melted area after the recording film is melted at recording, leading to easy rise in temperature of the adjacent tracks. According to the preferred embodiment of the present invention, heat is generated discretely and the undulations formed by the particles suppress the growth of a crystal, preventing unwanted re-crystallization from occurring as well.

Various types of materials known to be used for optical disks such as Ge—Sb—Te system with compositions of, for example $Ge_2Sb_2Te_5$, $Ge_4Sb_2Te_7$, and $Ge_5Sb_{70}Te_{25}$, and Ag—In—Sb—Te derivatives with compositions of, for example $Ag_4In_6Sb_{65}Te_{25}$, may be used for producing the recording layers depending on the required recording speed and other characteristics.

In addition to phase change, such recording mechanisms may be considered as direction change of magnetization, hole formation in the recording layer (phase-change material layer, etc.), which has no re-writability, destruction of coloring ability, change in color, and change/deformation in an adjacent photoconductor layer or substrate.

If re-writability is not required, various types of organic conductive material and dyes with low conductivity used for CD-R and DVD-R, photo-chromic dyes, and other unknown dyes may be used. In these cases, such mechanisms may be used as optical change caused by structural change in the organic material itself and/or the photoconductor layer and/or the substrate surface due to the behavior of a light beam and/or electric current, and hole formation.

To increase the speeds of crystal nucleus formation and crystal growth, facilitating crystallization, preferably, an interface layer is formed between the substrate and the recording film.

Preferably, among the group mainly consisting of Ta oxides such as $Ta_2O_5$, Cr oxides such as $Cr_2O_3$, Al oxides such as $Al_2O_3$, Si oxides such as $SiO_2$, SiO, Ge oxides such as $GeO_2$, Sn oxides such as $SnO_2$, Zr oxides such as $ZrO_2$, Co oxides, Ni oxides, Cr nitrides, Ge nitrides, Ti nitrides, Al nitrides, Si nitrides, Ta nitrides, Zr nitrides, B nitrides, and Hf nitrides, a single material or a mixture of the materials is used for the interface layer.

ZnS of less than 50 atom % may be added to these materials. Among the materials, $Cr_2O_3$, which may suppress variation in reflectance at repetitive rewriting to the level 5% or lower, reducing jitter, is preferably used.

CoO, $Cr_2O$, and NiO, of which particle sizes of their crystals at initial crystallization are uniform and for which a rise in jitter at the early stage of rewriting is small, may be further preferably used.

AlN, TaN, TiN, ZrN, BN, CrN, $Cr_2N$, GeN, HfN, or $Si_3N_4$, Al—Si—N system (for example, $AlSiN_2$), Al—Ti—N system, Si—Ti—N system, Si—O—N system, and any mixture of these nitrides, which have high adhesive power and the information recording media made from these materials are less deteriorated by harmful external atmosphere, may be further preferably used.

60 mol % or more of Cr—Ge derivatives such as $Cr_{80}Ge_{20}$ and Cr—Ge oxides or Cr—Ge nitrides can improve the shelf lives of the recording media and ensure the high recording performance of the recording media even when they are placed in the environment with high temperature and relative humidity.

(Dielectric (Insulator) Protective Layer)

Preferably, the melting point for an insulator layer around the recording layer is 600° C. or higher. If any material with its melting point lower than 600° C. is used for the insulator layer, the layer deteriorates by heat emitted from the recording layer at recording and heat emitted from the insulator itself, which may lead to change in optical characteristic, reducing the S/N.

Simply by taking their own preferred ranges for film thickness or individual materials for each layer, recording performance such as recording/reproduction characteristics can be improved. However, in particular by combining the preferred ranges for them, the performance can be further improved.

Many types of oxides and nitrides may be used for the materials for the insulator layer including $SiO_2$, $Al_2O_3$, $Cr_2O_3$, $Ta_2O_5$, $GeO_2$, GeN, $Si_3N_4$, $(ZnS)_{80}(SiO_2)_{20}$, and those with the same compositions as but different compound ratios from the former materials.

(Substrate)

According to the preferred embodiment of the present invention, a polycarbonate substrate 77 with grooves directly on its surface for tracking, wherein the substrate with grooves for tracking has grooves with $\lambda/15n$ (n is the refraction index of the substrate material) or larger of depth on the entire or partial surface of the substrate assuming that the recording/reproduction wavelength is $\lambda$.

The grooves may be formed on the substrate surface continuously with no discontinuity or it may be divided into plural portions. It was clarified from our experiment that about $\lambda/12n$ of groove depth was preferable from the aspect of balancing between tracking and noise. The widths of these grooves may depend on their radial locations.

The substrate in the format enabling information to be recorded/reproduced in both the grooves and land portions may be used or the substrate in the format enabling information to be recorded in either of them may be used. In the case of the type enabling information to be recorded only in the grooves, preferably, the track pitch is around 0.7 times the ratio of wavelength/focusing lens NA and the width of the groove is around ½ of it.

In applications where low manufacturing cost is not required, such glass substrates may be used as those, on which concave and flat patterns such as grooves and land portions by etching on glass substrates with photo resist as an etching mask and those, on which concave and flat patterns are transcribed on the UV cured resin layers from a stumper.

When for example, a four-element array laser was used as the laser light source, the data transfer rate could be improved by about four times.

If transparent electrodes are disposed on the lower part (light beam incident side) and upper part of the phase-change recording layer of the recording medium according to the preferred embodiment of the present invention and the light beam is irradiated on the area where the recorded mark is to be formed while about 5 V voltage is applied across the electrodes, a current flows through the recording layer and metal particles in only the area where the photo-carriers generated by light irradiation in the Ge—Sb—Te recording layer, allowing information to be recorded at a lower laser power, as well as accurate recorded marks to be formed because of the increased threshold for recording.

If the thickness of the upper protective layer is reduced to 10 nm or less, the Al alloy reflective layer itself may take a role of the electrode on the reflective layer side, eliminating no need for an upper transparent electrode.

Power could be supplied to these disks requiring applied voltage without physical contact from the disk rotating axis, for example by transferring energy between a high power (150 mW) semiconductor laser on the fixed drive side and solar cells around a disk support.

Wiring was connected from the solar cells to the disk support and then extended to two or more transparent electrodes elongating from the disk recording area to the innermost area.

The recording medium according to the preferred embodiment of the present invention may be either a magneto-optical recording medium or a magnetic recording medium, in particular heat-assisted magnetic recording medium and photo-assisted magnetic recording medium, both of which have excellent characteristics because they are magnetized and the recording area, in which the signal-fidelity from the particles magnetized with a certain direction is enhanced.

In these cases, the layer made from a phase-change material is not required to be deposited but the direction of the easy-axis of magnetization for the particles such as Pt—Fe must be fixed uniformly.

To satisfy such a requirement, any method, for example heating while applying a strong magnetic field, is used. The plasmon-excitation resonance absorption effect caused by a irradiated light beam facilitates magnetization-direction change even in the weak external magnetic field.

For magneto-optical recording, the known optical head for magneto-optical recording and magnets for applying a magnetic field are used.

For magnetic recording, the magnetic head for recording, for heat assisted magnetic recording, a heater is added to the magnetic head, and for photo assisted magnetic recording, the recording head with coil and focusing optics is used.

Magnetic energy, and for some cases, additional thermal energy, or optical energy are applied to the recording medium at recording. A GMR magnetic head is used a reading out.

In these cases, a composition of any Pt—Co alloy, for example Pt50Co50, is preferably used for the ultra-fine particles, facilitating the arrangement of the easy-axis of magnetization by applying a magnetic field while heating.

In this case, no layer is formed above the layer 8 shown in FIG. 1. A glass substrate is used for the substrate.

Embodiment 2

The recording medium and device configuration according to the second preferred embodiment of the present invention are similar to those according to the first preferred embodiment of the present invention with an exception that multi-level recording was used for the recording system. To achieve multi-level recording, the rate of the space occupied by the recorded mark of the unit length on the recording track was changed.

Figure 5:
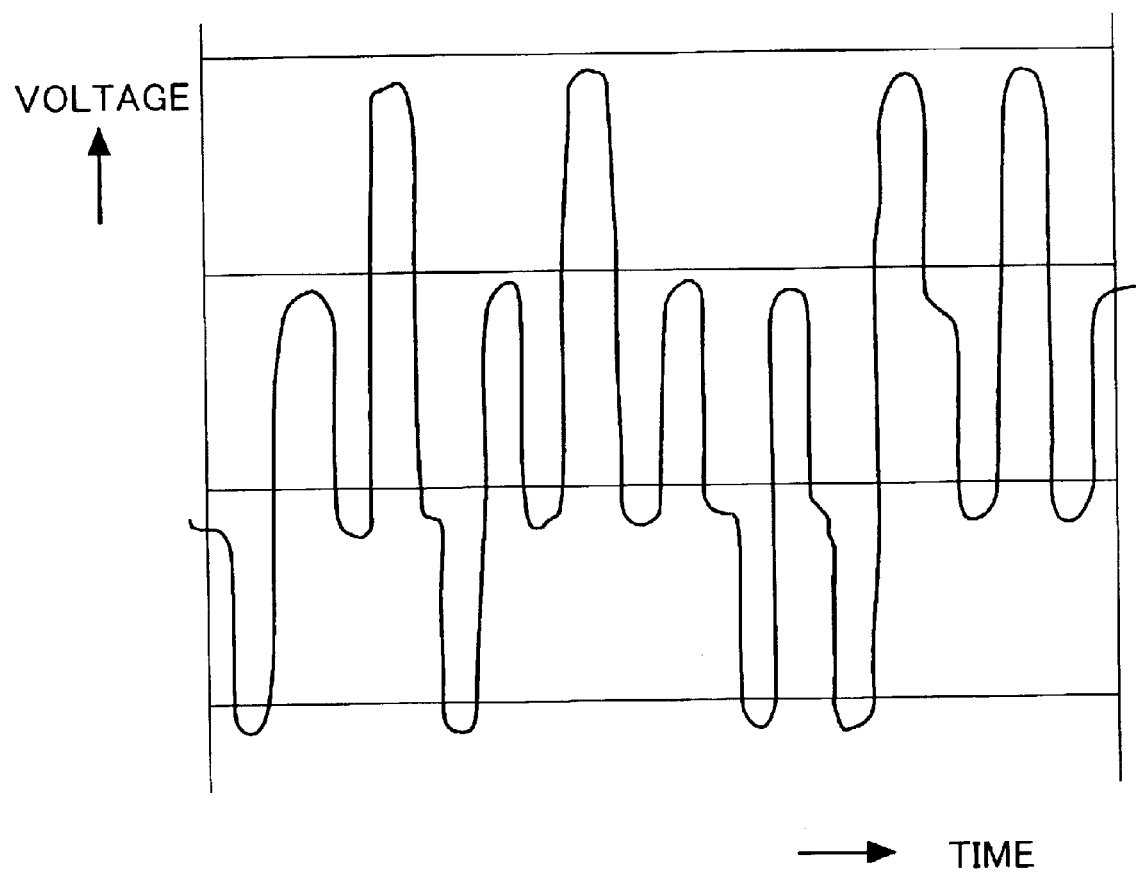
FIG. 5 is a view showing an example of traced reproduced multi values recorded on the information recording medium according to one preferred embodiment of the present invention.

If information was multi-level recorded on the standard phase-change recording medium, distortion developed unavoidably in the shape of the recorded mark as shown in FIG. 4 through FIG. 8 in the paper by M. Horie et al., PCOS2001 Proceedings, 2001, p.20 and subsequent pages and an error tended to occur in read out signals. According to the preferred embodiment of the present invention, for the self-assembled recording medium, correct shapes of marks could be recorded when information was recorded in the same manner and correct 4-value level of signals were achieved as known from an example of waveform tracing of signals were reproduced (FIG. 5).

When four lines were drawn in the figure at a given timing for identifying the area corresponding to each value level, the value levels could be determined at an error rate one order lower than that of the conventional media. Even for 8-value level recording as mentioned above, the error rate was only two times that for 4-value level recording.

Embodiment 3

The third preferred embodiment of the present invention relates to a multi-layer recording medium and a recording device, on which information is recorded in/reproduced from the multi-layer recording medium.

Figure 6:
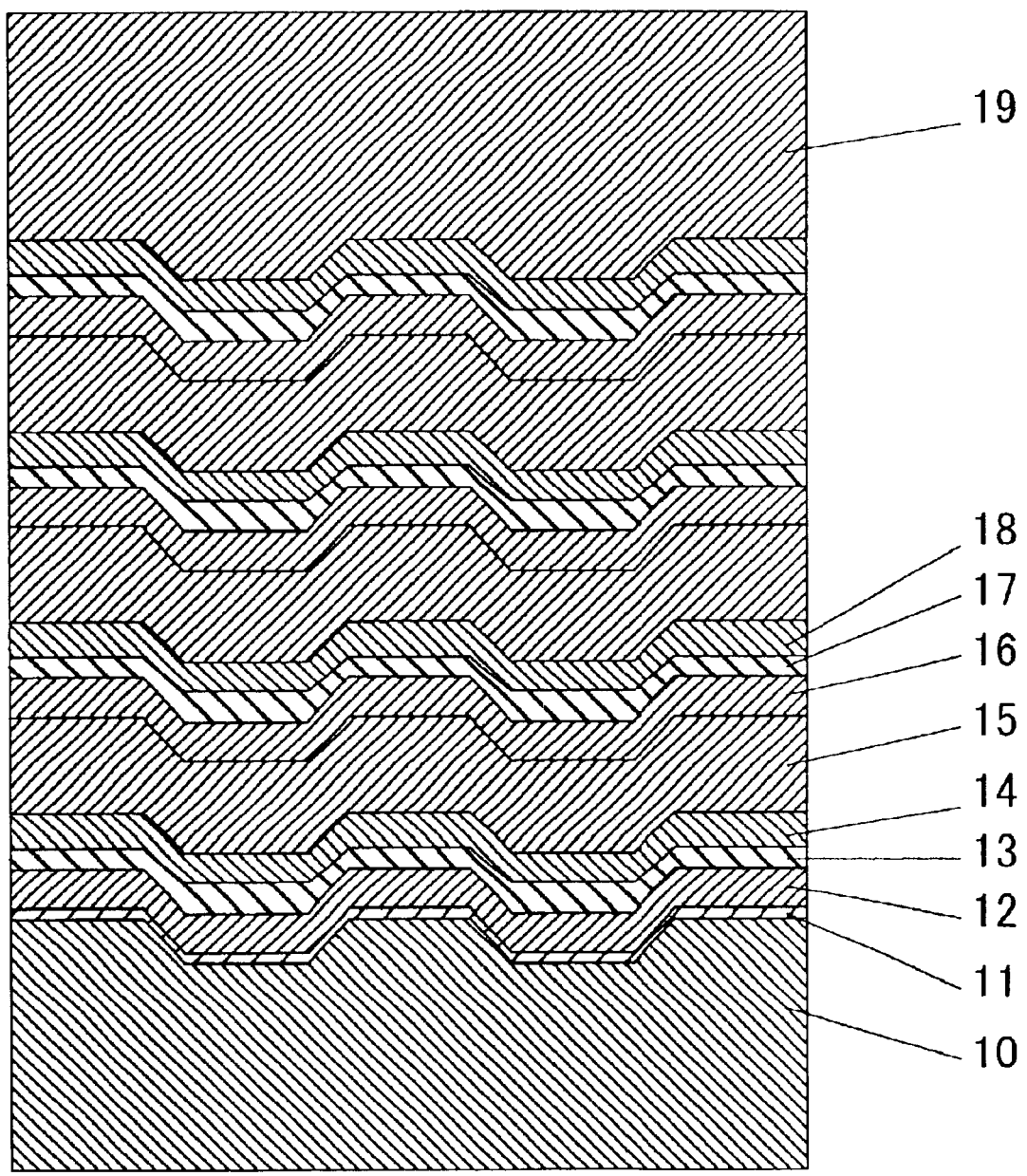
FIG. 6 is a view showing the cross section of the multi-layer information recording medium according to one preferred embodiment of the present invention.

As shown in FIG. 6, the first layer of the recording medium is formed in the same manner as that for the first preferred embodiment of the present invention.

Note that since the wavelength of the light source used in our experiment is long, wider track pitch (1 $\mu$m) and groove width (0.3 $\mu$m) were used. Instead of metal particles, $SiO_2$ particles, around which 5 nm film of cyanine dye was coated and then oleic acid was applied on them, were used.

In this case, no Ge—Sb—Te recording layer was formed. First, a 10 nm-thick $Ag_{95}Pd_3Cu_2$ half transparent reflective layer 11 was formed on the substrate surface for auto-focus and tracking.

FIG. 6 shows the area from the recording layer to the upper protective layer shown in FIG. 1 by thick shaded layers 13 and 17 with no detailed descriptions.

$SiO_2$ particles with a cyanine dye film coated around were produced in the manner described below.

Colloidal silica commercially available was dispersed in an alcohol solution to deposit a 1 nm-thick Au layer on the particle surfaces from gold-complex. Next, cyanine dye with thiol group at its end was added to them.

Directly on the first layer formed as mentioned above, a 100 nm of transparent spacer layer was formed for insulation by spattering with $(ZnS_{80}(SiO_2)_{20}$ and then the layer, in which periodic arrays of $SiO_2$ particles with the die coated around were formed, was deposited in the same manner as that for the first layer.

Note that in the second layer, a slightly different $SiO_2$ particle size was used than that of the first layer.

The particle size was determined by selecting the layer to be collected after particles with particle sizes distributed were formed by, for example, particle formation by vacuum evaporation and then the solution with the particles dispersed was centrifuged.

Since coating is applied repeatedly (not shown in FIG. 6), the undulations of the grooves were filled with the coating material into flatness from the top of them On the recording medium formed as mentioned above, a laser beam with its wavelength selected was irradiated through an optical head using a valuable wavelength semiconductor laser as a light source.

Any dye laser or titan-sapphire laser may be used as the variable wavelength laser but preferably, an known variable wavelength semiconductor laser is used from an aspect of miniaturization of devices.

In the preferred embodiment of the present invention, a DFB laser was used, although a DBR laser has an advantage in that the wavelength may be easily selected.

As already well known, since the wavelength, at which the resonance absorption phenomenon occurs in optical absorption particles, depends on the particle size, the layer, in which absorption occurs, is determined by the wavelength. This means that the irradiated light beam can be absorbed by the deepest layer with less adverse influence of absorption by the layer front of it, enabling information to be recorded in/read out from any layer.

Since the light beam is absorbed by each neat layers, information can be recorded and reproduced in the direction of film thickness with no error.

A cover-coating layer of UV cured resin was formed on the above-mentioned film stack mentioned above and glued together with another similar disk.

The configuration of the recording/reproduction device is the same as that of the first preferred embodiment of the present invention. Information was recorded by decolorizing the dye layer through irradiation of a high intensity of light beam. Information was read out using change in reflectance caused by decolorization.

Using such an optical design that any change in dye can be easily recognized as a difference in reflectance, information may be read out individually from each layer of the multi-layer recording film.

It is preferable that the optical film thickness of the area between the recording layers corresponds to about one wavelength of a reading light beam, allowing every recording layer to be optically equivalent.

It is convenient for high-density recording with the focus point shifted toward the deeper point that the thickness of each layer is almost the same as that of the focus depth of the focusing lenses and the dye concentration is changed by diluting with a transparent organic material so that the optical absorption coefficient may become larger as the light beam advances.

Making the thickness of each layer thinner is useful in volume hologram recording. It may be acceptable that multi values are recorded in such a manner that the film thickness is made thinner using the same optical absorption coefficient for every layer and information is recorded in the deeper layer for high-power beam irradiation while only in the front layer for low-power beam irradiation.

The layers of entire film stack may be split into plural groups, for example four layers may be divided into the two-layer group by inserting insulating layers or spacer layers in this preferred embodiment of the present invention.

An insulating layer may be a transparent inorganic dielectric and more optically preferably, any organic material is used for the same reason as that mentioned above. Despite the fact that more preferably, the insulating layer is not conductive, various types of films may be used such as the films vacuum evaporated with acrylic oligomer, polymer, and metal-phthalocyanine.

The entire multi-layer film may be formed within the focus depth of the focusing lens or it may be formed so that the focus point is shifted for recording or reproducing information on each layer by inserting a 20–40 $\mu$m of spacer layer at an interval of a given number of plural layers (for example, every three layers). In this case, when two or more spacer layers are used, an element for compensating for spherical aberration is desirably is disposed n the optics.

It may be acceptable that each self-assembled ultra-particle layer of the multi-layer film is inserted between transparent electrodes in the same manner as that for the first preferred embodiment of the present invention and information is recorded while a voltage is being applied. In this case, by inserting a known organic or inorganic electro-chromic layer between the transparent electrodes, the color of only the electro-chromic layer, in which the voltage is applied, can be changed, reducing the adverse influence of optical absorption by the front layer when information is recorded in or reproduced from the deeper layer.

Various types of materials, which are specified as "may be used for a dielectric (insulator) protective layer" in the first preferred embodiment of the present invention, may be used for the particles instead of $SiO_2$.

Embodiment 4

According to this preferred embodiment of the present invention, the same recording medium is used as that for the first preferred embodiment of the present invention, although ultra-fine particles made from the phase-change recording material with organic molecules coated around are used for inorganic ultra-fine particles. The ultra-fine particles are made in such a manner that after an acrylic derivative monomer is sprayed while the recording material is being evaporated in the low vacuum environment, these particles are dispersed in the organic solvent and centrifuged, and then only the appropriate particles with sizes of an accuracy ±10% are picked up.

The recording medium was made in the manner mentioned below.

Figure 7:
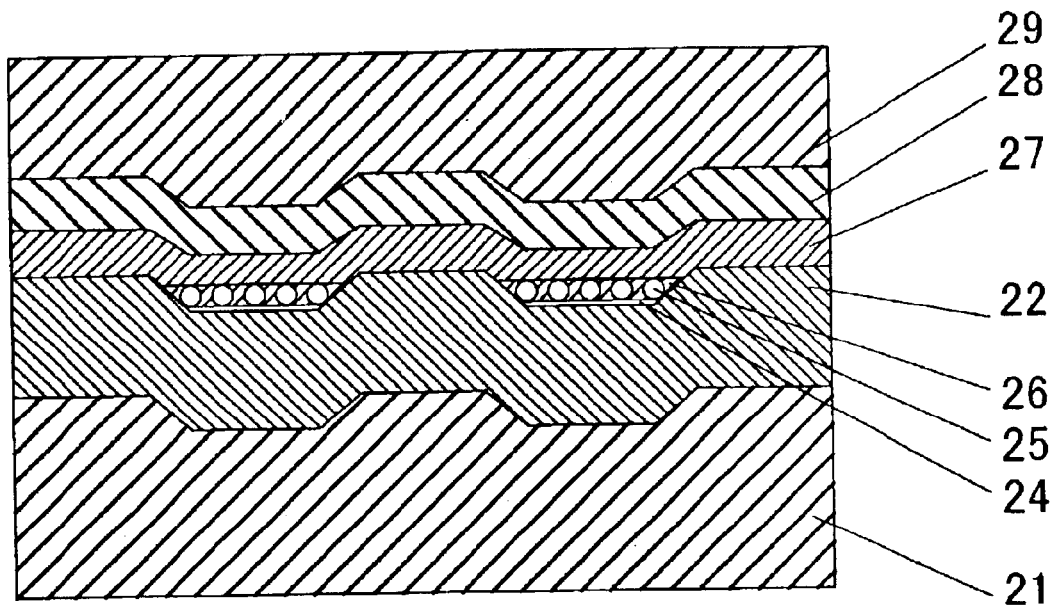
FIG. 7 is a view showing the cross section of the information recording medium according to one preferred embodiment of the present invention.

First, as shown in FIG. 7, 30 nm of $SiO_2$ layer was formed on a polycarbonate substrate 21 with 8 cm of diameter and 0.6 mm of thickness, of which surface had tracking grooves (width 0.15 $\mu$m) with 0.4 $\mu$m of track pitch and 23 nm of depth for in-groove recording (land recording from the viewpoint of a optical spot) and, on which addresses were represented by wobble of the grooves.

Groove patterns were transcribed on the substrate surface using a nickel master from glass master photo resist. Polyethylene imine dissolved in a chloroform solution was coated on the above-mentioned $SiO_2$ recording film and then dried.

Then, plural Ge4Sb2Te7 (phase-change material) particles with 15 nm of diameter, around which oleyl amine and oleic acid molecules were coated, were dissolved in the hexane solution and coated, and then the particles not adhered to polyethylene imine were rinsed away.

The above-mentioned tracking grooves are intermittent at an interval of 65 nm and an about 10 nm non-groove portion lies between the grooves. The arrays of recording film material particles are regularly packed in each groove at an interval of 15 nm as shown in FIG. 2.

On this layer, 20 nm-thick $(ZnS)_{80}(SiO_2)_{20}$ protective layer and 60 nm-thick $Al_{90}Ti_{10}$ reflective layer were formed. For the recording layer, a known Ge—Sb—Te system recording material, for example $Ge_2Sb_2Te_5$ or $Ge_5Sb_{70}Te_{25}$, or an Ag—In—Sb—Te system recording material was used. A film stack was formed using magnetron-spattering equipment.

Thanks to the existence of regularly arranged Pt—Fe particles with the same size described above, an irradiated light beam, when being absorbed by these particles, generates heat. Accordingly, the periodical thermal pattern is produced, causing a rapid drop in temperature among phase-change material particles. This enables the range of the phase-change material particles in the array, of which phase changes at recording, to be correctly determined.

Note that disk-shaped information recording medium was achieved by applying a film of UV cured resin on the film surface of the above-mentioned disk element and gluing it together with another substrate with the same shape.

The same recording/reproduction method was used as that for the first preferred embodiment of the present invention and the recording/reproducing laser beam was entered from the substrate side.

Embodiment 5

According to this preferred embodiment of the present invention, the same type of recording medium is used as that for the fourth preferred embodiment of the present invention and granular atom aggregations (axiolites) such as $C_{60}$ (fullerene) are used instead of the phase-change material particles.

These atom aggregations are bound to the side chain formed in the polymer, for example polyethylene imine to arrange regularly. To record information, $C_{60}$ is excited by irradiating an intense light beam, causing a deformation in the polymer layer.

To read out information, refraction or scattering of the irradiated light beam is used.

Thus, according to another preferred embodiment of the present invention, the self-assembled recording medium using ball-shaped carbon or any organic molecules capable of being formed into ultra-fine particles may be used.

In this case, it may be acceptable that the light beam is absorbed by the organic molecules around the granular organic particles or the granular organic molecules with optical absorption may be used with the transparent organic molecules around them.

According to the preferred embodiment of the present invention, the information recording medium ensures fidelity of the shapes of recorded marks to the signals to be used for recording, enabling high density recording.

In addition, the information recording medium can be multi-layered and the effective recording density of them can be increased to make the recording capacity of the single medium farther larger.

What is claimed is:

1. An information recording medium, on which information is recorded by irradiating energy, comprising: a layer, in which inorganic and organic particle arrays are arranged alternately in the direction of a track.

2. An information recording medium according to claim 1, wherein a phase-change recording layer is formed adjacent to or in the vicinity of the above-mentioned layer.

3. An information recording medium according to claim 1, wherein the inorganic particles are made from a phase-change recording material.

4. An information recording medium according to claim 1, wherein the recording layer is formed on a substrate with periodical concaves and flat area in the direction of the track and the arrays are in line with the concaves on the substrate surface.

5. An information recording medium according to claim 4, wherein a polymer layer is inserted between the recording layer and the substrate.

6. An information recording medium according to claim 1, wherein the recording layer is multi-layered in the film thickness direction of the information recording medium.

7. An information recording medium according to claim 2, wherein the inorganic particles are formed by individual atom aggregations made from plural carbon atoms.

8. A method for recording information comprising:
- a step for applying energy to the recording medium having a layer with inorganic and organic materials are arranged alternately in the direction of the track;
- a step for causing the energy to be absorbed by the inorganic material or organic material selectively; and
- a step for recording information.

9. A method for recording information comprising:
- a step for applying energy through light beam irradiation or magnetic field application, wherein the spot, at which the light beam is irradiated or magnetic field is applied over the inorganic and organic partials.

10. A method for recording information according to claim 8, wherein electric energy is applied from electrodes to the inorganic and organic materials.

11. A method for recording information according to claim 10, wherein between the electrodes, the recording layer is inserted.

12. A method for recording information according to claim 8, wherein the recording layer is formed on the substrate having the regular concaves and flats in the direction of the track and the arrays are in line with the concaves on the substrate surface.

13. A method for recording information according to claim 8, wherein the polymer layer is inserted between the recording layer and the substrate.

14. A method for reproducing information, comprising:
- a step for irradiating a light beam on the medium having the layer with inorganic and organic material arrays with optical absorption efficients arranged alternately and detecting it;
- a step for generating reproducing signals so that each level of multi-level recording corresponds to the boundary between the inorganic and organic materials; and
- a step for reproducing information recorded on the medium.

* * * * *